(No Model.) 2 Sheets—Sheet 2.
G. VINE.
INSTRUMENT FOR MEASURING DIAMETERS.
No. 601,721. Patented Apr. 5, 1898.
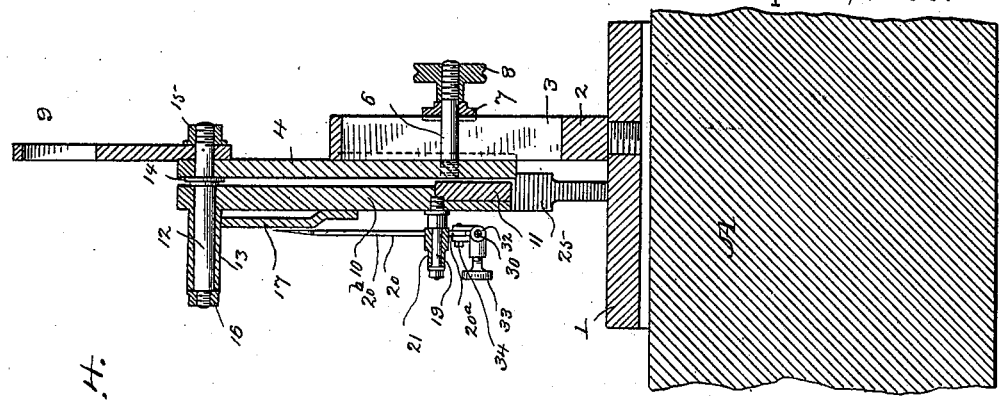
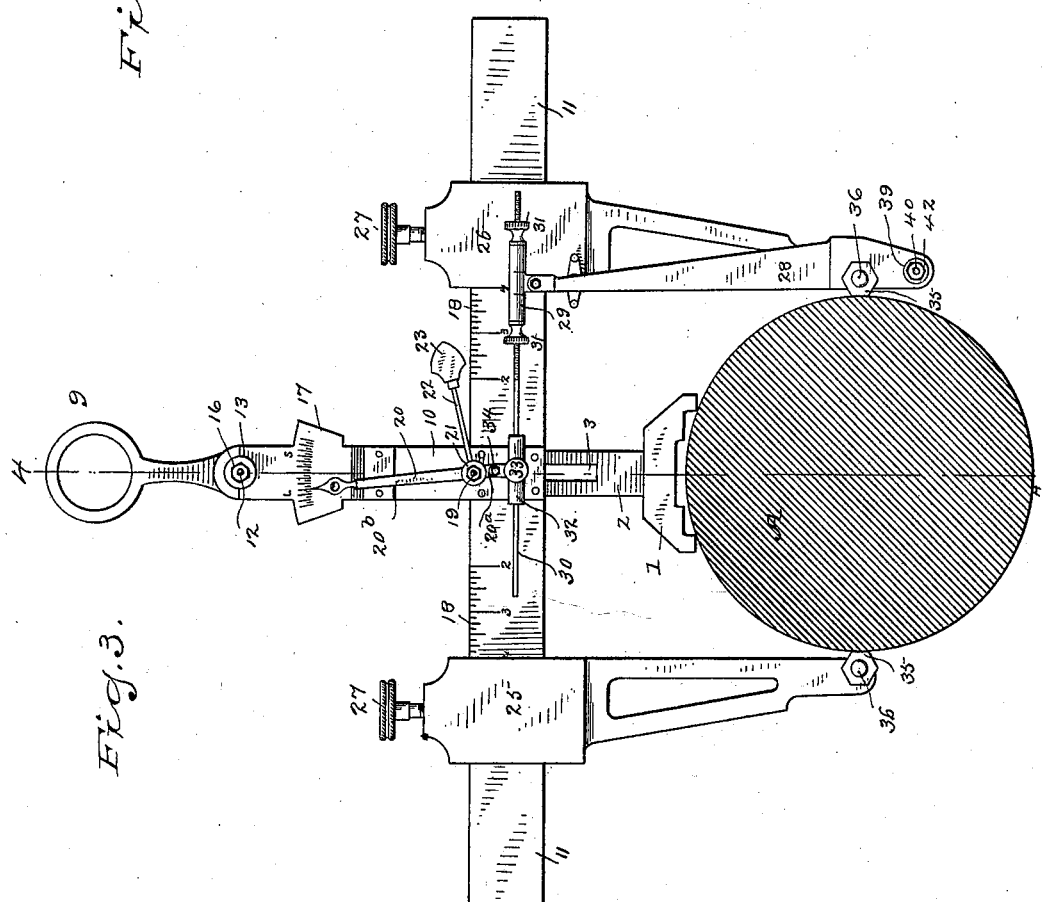
WITNESSES
H. H. Lamb
S. P. Heley
INVENTOR
George Vine
By A. M. Wooster
Atty.

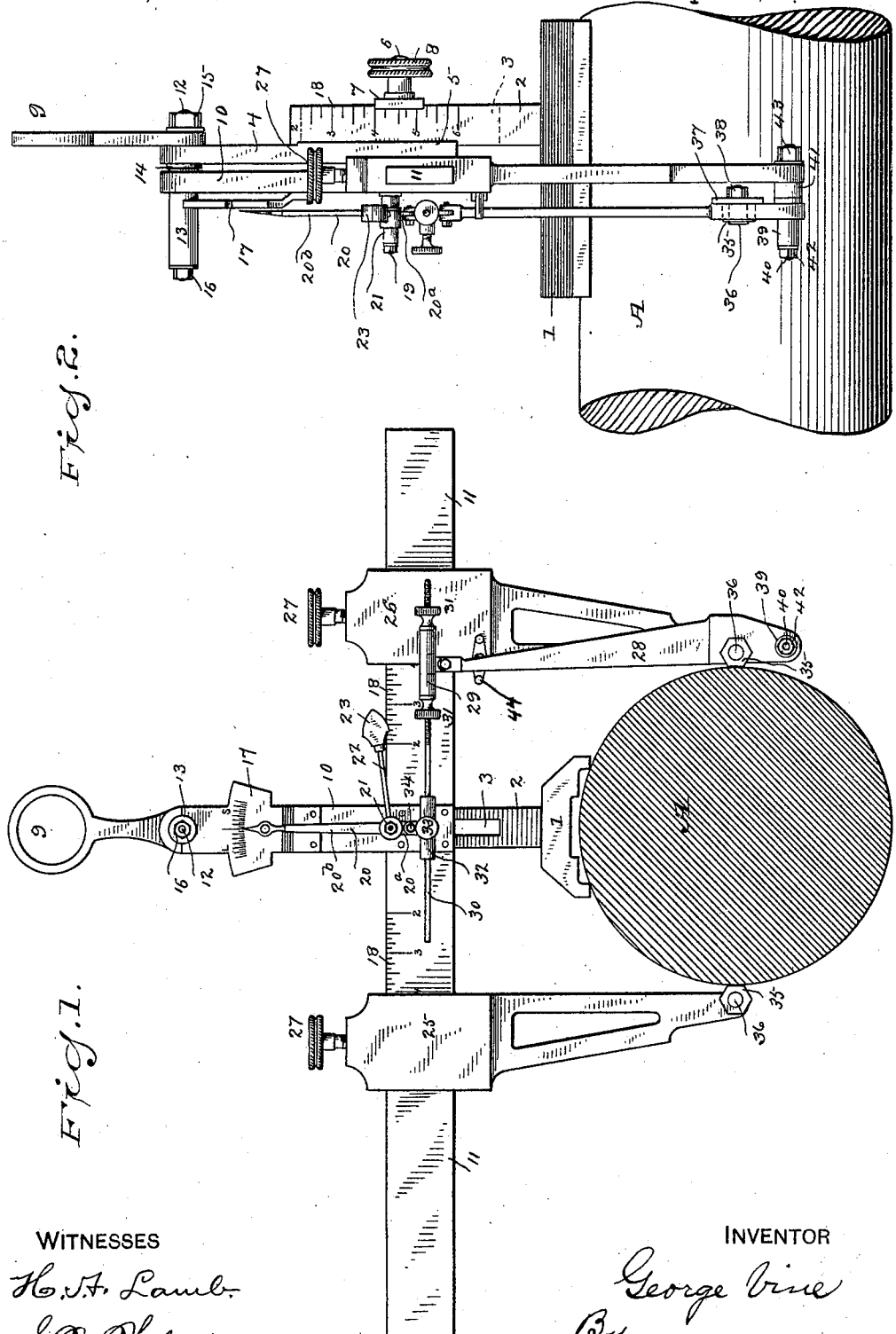

UNITED STATES PATENT OFFICE.

GEORGE VINE, OF ANSONIA, CONNECTICUT.

INSTRUMENT FOR MEASURING DIAMETERS.

SPECIFICATION forming part of Letters Patent No. 601,721, dated April 5, 1898.

Application filed June 30, 1897. Serial No. 642,897. (No model.)

*To all whom it may concern:*

Be it known that I, GEORGE VINE, a citizen of the United States, residing at Ansonia, in the county of New Haven and State of Connecticut, have invented certain new and useful Improvements in Instruments for Measuring Diameters; and I do hereby declare the following to be a full, clear, and exact description of the invention, such as will enable others skilled in the art to which it appertains to make and use the same.

My invention has for its object to produce an instrument for measuring—i. e., detecting differences in the diameters of—shafts, rolls, bearings, crank-pins, &c.; in short, for detecting whether a roll or bearing is in any way out of true. It is of course well understood that in calipering the operator must depend upon the sense of feeling. My present instrument is automatic in its operation and instantly detects the minutest variations in the diameter of the roll or bearing to which it is applied.

With these ends in view I have devised the novel instrument of which the following description, in connection with the accompanying drawings, is a specification, numbers and letters being used to designate the several parts.

Figure 1 is an elevation illustrating my novel instrument in use; Fig. 2, a side elevation corresponding therewith; Fig. 3, a view similar to Fig. 1, illustrating a slightly-changed position of the parts and the mode in which a variation in diameter is indicated; and Fig. 4 is a section on the line 4 4 in Fig. 3.

A denotes a roll to which my novel instrument is shown as applied, and 1 the base of the instrument, which rests upon the roll. The base is shown as stepped to accommodate different sizes of rolls—for example, rolls from two to six inches in diameter, all of which are within the range of a single size of instrument.

2 denotes a standard secured to the base and provided with a slot 3.

4 denotes a slide which is adapted to move vertically on the standard, flanges 5 being provided, which engage the sides of the standard to prevent lateral movement. A threaded rod 6 extends backward from the slide, passes through the slot and through a flanged block 7 on the back of the standard, and is engaged by a thumb-nut 8, which locks the slide and block in position on the standard. At the upper end of the slide I preferably provide a handle 9 for convenience in manipulating the instrument.

10 denotes a swing-lever pivoted at the upper end of the slide, to which spring-bar 11 is rigidly secured. I have shown the swing-lever as provided with an elongated bearing 13, which is mounted on a stud 12, said stud also serving to secure the handle to the slide. In practice the bearing of the swing-lever on this stud is a taper-ground bearing, so as to give the greatest possible accuracy of movement. I have shown a washer 14 between the slide and the swing-lever, the handle as held upon the stud by a nut 15 and the bearing as held upon the stud by a nut 16, which engages a shoulder on the stud, leaving the bearing to turn freely.

17 denotes a scale upon the swing-lever, which is ordinarily graduated to thousandths of an inch. Upon the sides of the standard (see Fig. 2) and upon the swing-bar (see Figs. 1 and 3) I place scales 18, graduated to inches and fractions thereof.

19 denotes a stud extending outward from the swing-lever, upon which an indicating-lever 20 is pivoted. The indicating-lever is provided with a hub 21 to provide an elongated bearing on the stud, said hub having extending therefrom at an angle to the pointer an arm 22, which carries a weight 23.

$20^a$ denotes, specifically, the short arm of the indicating-lever, the function of which will presently be more fully explained, and $20^b$ denotes the long arm of the indicating-lever, which serves as a pointer and indicates variations in the diameter of a roll or bearing upon the dial.

25 and 26 denote slides on the swing-bar which extend below the swing-bar, to which they are secured by set-screws 27.

28 denotes a bearing-lever pivoted at the lower end of slide 26.

Slide 25 and the bearing-lever both engage the roll when the instrument is in use. The upper end of the bearing-lever is pivoted to an adjustable block 29, carried by adjusting-rod 30. The end of this rod which carries block 29 is threaded and the block is locked in position thereon by set-screws 31.

32 denotes a block through which the adjusting-rod slides and which is locked to the adjusting-rod by a set-screw 33. The short arm 20ᵃ of the indicating-lever is pivoted to block 32, as at 34.

35 denotes hardened bearings, one of which is carried by slide 25, the other by bearing-lever 28. These bearings, which are preferably recessed into the slide and the bearing-lever, respectively, are adapted to bear on the roll and are shown as made hexagonal, so that when a face becomes worn the bearing may be turned to present a new surface to the roll. The manner in which these bearings are set will be clearly understood from Figs. 1 and 2, in which they are shown as held in place by bolts 36, which pass through the bearings, through plates 37, which are made part of the slide, and the bearing-lever, respectively, and are engaged by nuts 38, one only of the plates and nuts being shown in the drawings. The connection of the bearing-lever to slide 26 consists of an elongated bearing 39, made integral with the bearing-lever, through which a stud 40 passes, said stud also passing through an elongated bearing 41 on slide 26. The stud is retained in the bearing-lever by a nut 42, and the bearing is held upon the stud by a nut 43, which engages a shoulder on the stud, leaving the bearing to turn freely on the stud.

In practice I ordinarily make one end of the swing-bar—the left end, as seen in Figs. 1 and 3—longer than the other end, so that the slightly-increased length of the bar will serve as a weight to throw the bearing carried by slide 25 against the roll. Weight 23 will of course act to throw the other bearing—i. e., the bearing carried by the bearing-lever—against the other side of the roll. 44 denotes a plate rigidly secured to slide 26 and carrying pins, which serve to limit the oscillation of the bearing-lever in either direction.

In constructing my novel instruments I ordinarily so proportion the bearing-lever and the short arm of the indicating-lever as to cause them to bear to each other the relation of fifty to one, thus causing the indicating-lever to amplify the oscillations of the bearing-lever in that proportion and graduate scale 17 to indicate thousandths of an inch.

The operation is as follows: Suppose that the instrument is to be applied to detect variations in the diameter of a four-inch roll. The operator first adjusts slides 25 and 26 on the swing-bar and slide 4 on the standard by means of the scales 18. The effect of the adjustment of slides 25 and 26 is to place the hardened bearings at the required distance—i. e., four inches—apart, so as to just receive the roll between them. The effect of the adjustment of slide 4 on the standard is to cause the hardened bearings to rest diametrically opposite each other—that is to say, in such a position that a line drawn from center to center of the bearings will intersect the center of the roll. It will be noticed in Figs. 1 and 3 that slides 25 and 26 have been moved away from the standard until their inner edges register with the line corresponding to the numeral 4 in each scale, and in Fig. 2 that slide 4 has been moved until the top of flanged block 7 corresponds with the numeral 4 in the scale on the standard. The operator then places the instrument in position on the roll, as in Figs. 1 and 3, the pointer—i. e., the long arm of the indicating-lever—registering with the center line of the scale, as indicated in Fig. 1. Should the indicating-lever require adjustment in order to make the long arm thereof—i. e., the pointer—register with the center line of the scale—for example, should the indicating-lever, when the instrument is placed in position on a roll, be in the position illustrated in Fig. 3—the required adjustment may be effected approximately by loosening set-screw 33 and shifting block 32 on the adjusting-rod. The exceedingly fine adjustment required, however, is usually effected by loosening one of the set-screws 31 slightly and moving the adjustable block slightly in the direction required by means of the other set-screw 31. It will be apparent that when the roll is in rotation if the operator moves the instrument along the roll variations in the diameter of the roll will act to impart slight oscillatory movement to the bearing-lever and that the oscillations of the bearing-lever will be transmitted to the indicating-lever amplified in the proportion of fifty to one, so that the minutest variations in the diameter of the roll will be indicated by the pointer upon the scale. If the roll at a given place is one-thousandth of an inch, more or less, less than four inches in diameter, the pointer will move toward the right on the scale, and if the roll at any place is more than four inches in diameter the pointer will move toward the left on the scale, the letters "L" and "S" on the scale being merely abbreviations of the adjectives "large" and "small."

Having thus described my invention, I claim—

1. The combination with a standard, a swing-lever suspended therefrom and having a scale, and a swing-bar rigidly secured to the swing-lever, of adjustable slides on the swing-bar, a bearing-lever pivoted to one of the slides, said bearing-lever and the other slide being adapted to engage a roll and mechanism intermediate the bearing-lever and the scale whereby variations in the diameter of the roll are indicated on the scale.

2. The combination with a base, a standard, a swing-lever suspended therefrom and having a scale and a swing-bar rigidly secured to the swing-lever, of adjustable slides on the swing-bar, a bearing-lever pivoted to one of the slides, said bearing-lever and the other slide being provided with hardened bearings to engage a roll and mechanism connected with the bearing-lever for indicating variations in the diameter of the roll.

3. The combination with a standard, a slide 4 adjustable thereon, a swing-lever pivoted to the slide and a swing-bar fixed to the swing-lever, said standard and said swing-bar being provided with scales 18 for the purpose set forth, of slides 25 and 26 on the swing-bar, a bearing-lever pivoted to slide 26, said bearing-lever and slide 25 being adapted to engage a roll and mechanism connected with the bearing-lever for indicating the oscillation of said lever.

4. The combination with a standard, a swing-lever and a swing-bar secured thereto, of adjustable slides on the swing-bar, a bearing-lever pivoted to one of the slides, said bearing-lever and the other slide being adapted to engage a roll, indicating-lever 20 and adjusting-rod 30 pivotally connected to the bearing-lever and to the short arm of the indicating-lever.

5. The combination with a standard, a swing-lever having a scale, and a swing-bar secured to the swing-lever, of adjustable slides on the swing-bar, a bearing-lever pivoted to one of the slides, said bearing-lever and the other slide being adapted to engage a roll, indicating-lever 20, adjusting-rod 30, block 29 adjustable on said rod to which the bearing-lever is pivoted and block 32 also adjustable on said rod to which the short arm of the indicating-lever is pivoted.

6. The combination with a standard, a swing-bar suspended therefrom, adjustable slides on the swing-bar and a bearing-lever pivoted to one of the slides, of an indicating-lever having a hub 21, an arm and weight extending from said hub at an angle to the lever and adjusting-rod 30 to which the bearing-lever and the short arm of the indicating-lever are connected.

7. In an instrument of the character described the combination with a swing-bar, slides thereon, and a bearing-lever pivoted to one of said slides, said bearing-lever and the other slide being provided with adjustable hardened bearings adapted to engage opposite sides of the center of a roll, of an indicating-lever and an adjusting-rod to which the indicating-lever and the bearing-lever are connected.

8. In an instrument of the character described the combination with a swing-lever having a scale, a swing-bar, slides thereon, and a bearing-lever pivoted to one of said slides, said bearing-lever and the other slide being adapted to engage a roll, of an indicating-lever the long arm of which registers with the scale and an adjusting-rod which is connected to the bearing-lever and to the short arm of the indicating-lever.

In testimony whereof I affix my signature in presence of two witnesses.

GEORGE VINE.

Witnesses:
A. M. WOOSTER,
S. V. HELEY.